Feb. 10, 1942.  J. C. CROWLEY  2,272,965
VULCANIZER CLAMP
Filed Feb. 23, 1938  2 Sheets-Sheet 1
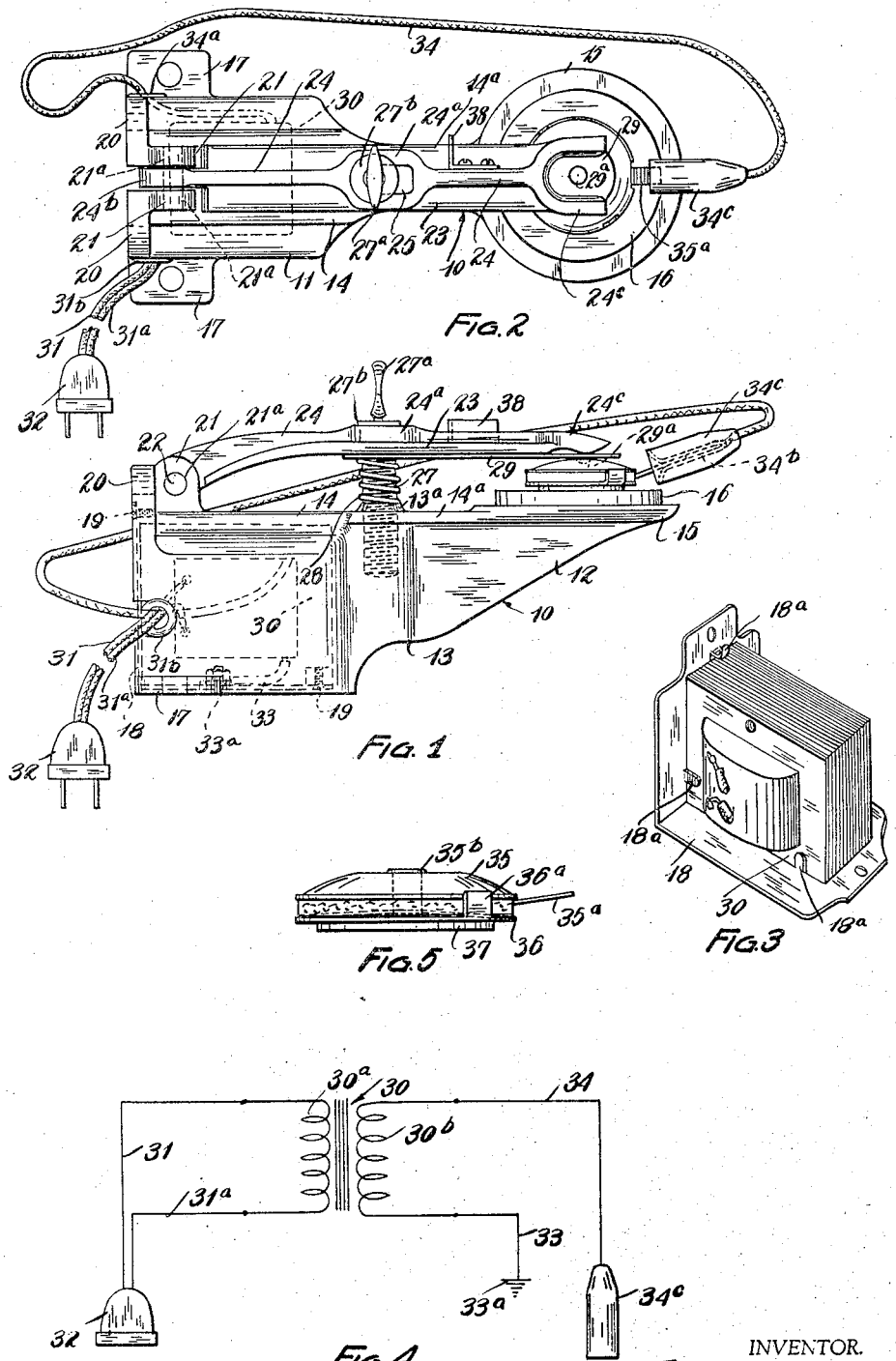
INVENTOR.
JOHN C. CROWLEY
BY
Kwis Hudson Kent
ATTORNEYS

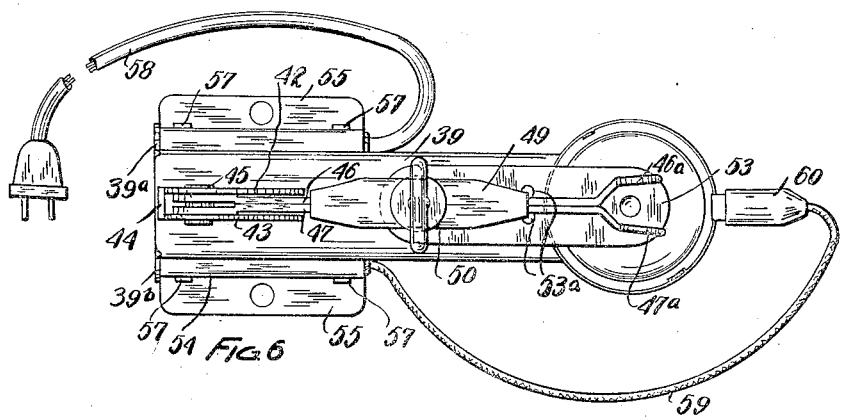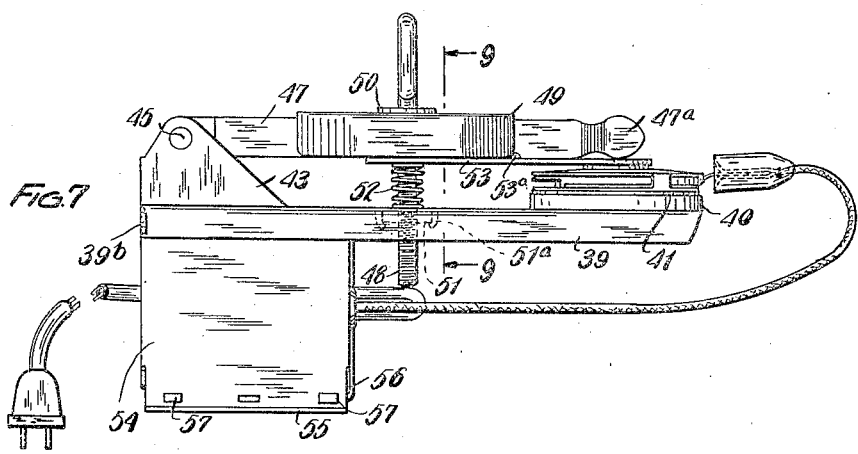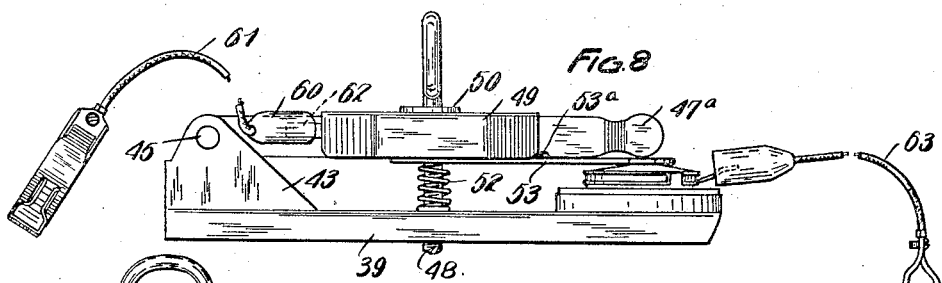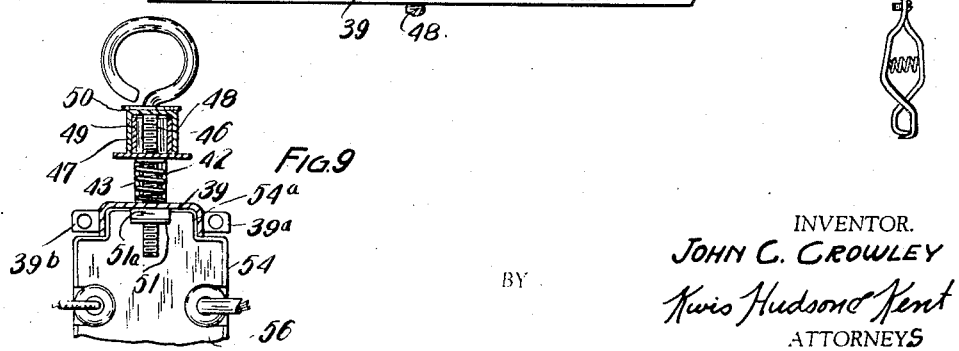

Patented Feb. 10, 1942

2,272,965

UNITED STATES PATENT OFFICE 2,272,965

VULCANIZER CLAMP

John C. Crowley, Cleveland Heights, Ohio, assignor to The Dill Manufacturing Company, Cleveland, Ohio, a corporation of Ohio Application February 23, 1938, Serial No. 192,117

16 Claims. (Cl. 219—19)

This invention relates to a vulcanizer clamp and particularly to a clamp to be used with an electrically heated vulcanizing unit although, of course, the clamp could be employed with other types of vulcanizing units.

An object of the invention is to provide a vulcanizing clamp which is compact, can be readily employed for vulcanizing either plain rubber patches or the rubber bases of valve stems to inner tubes or other inflatable rubber articles and which clamp is efficient in operation.

Another object is to provide a vulcanizer clamp for use with electrically heated vulcanizing units, and which is so constructed that it may be used with the ordinary commercial electric current or with current from storage batteries or other sources.

Another object is to provide a vulcanizer clamp wherein the clamp itself during the vulcanizing operation is in the electrical circuit with the electrical heating element in the vulcanizing unit employed with the clamp.

Further and additional objects and advantages not hereinbefore referred to will become apparent hereinafter during the following detailed description of embodiments of the invention.

Referring to the accompanying drawings,

Fig. 1 is a side elevational view of a vulcanizer clamp embodying the present invention and shows one form of vulcanizing unit mounted in the clamp.

Fig. 2 is a top plan view of the vulcanizer clamp and vulcanizing unit shown in Fig. 1.

Fig. 3 is a detail perspective view of a part of the clamp, namely, the closure plate supporting the transformer.

Fig. 4 is a diagrammatic view of the electrical circuit in the clamp.

Fig. 5 is an elevational view of the vulcanizer unit shown in Figs. 1 and 2.

Fig. 6 is a top plan view of a modified form of clamp embodying the invention, this clamp being constructed of sheet metal stampings as distinguished from the clamp of Fig. 1 which is formed of castings.

Fig. 7 is a side elevational view of the clamp shown in Fig. 6.

Fig. 8 is a side elevational view of the clamp similar to Fig. 7 but shows the transformer omitted and the clamp adapted for use with a storage battery, and Fig. 9 is a sectional view taken substantially on line 9—9 of Fig. 7 looking in the direction of the arrows.

The clamp shown in Figs. 1 to 3 inclusive comprises a body indicated generally at 10, and in the form of a metal casting. The body 10 is provided at one end of the clamp with a substantially rectangular housing compartment 11, from the forward end of which (the right hand end as viewed in the drawings) and midway between its sides extends the integral rib 12 connected to the housing compartment 11 by a rounded hollow portion 13. The upper side of the housing compartment 11 is provided with a centrally disposed raised integral portion 14 that extends forwardly and overlies the upper edge of the rib 12, as indicated at 14a. The horizontal portion 14a that overlies the rib 12 merges into the enlarged circular and horizontal (as viewed in the drawings) vulcanizing table 15 which is recessed on its upper side to receive an article supporting cushion 16 preferably formed of fairly soft rubber.

The lower rear corners of the housing compartment 11 are provided with integral laterally extending ears 17 having openings therein through which suitable fastening means can be passed for securing the clamp to a supporting surface. The rear and undersides of the housing compartment are formed open, but when the clamp is fully assembled are closed by means of an L-shaped closure plate 18 that is removably secured in place by suitable means such as the screws 19, as clearly indicated in Fig. 1.

The upper and rear corners of the housing compartment 11 are provided with integral upwardly extending portions 20 which have at their inner and adjacent ends forwardly extending parallel spaced ears 21, which ears are also integral with the raised portion 14, as clearly shown in Fig. 1. The portions 20 are provided with openings indicated in dotted lines in Figs. 1 and 2, through which securing means such as screws may be passed to secure the clamp to a supporting surface, it being understood that these openings may be employed for this purpose instead of or in conjunction with the openings in the ears 17, if so desired. The ears 21 are provided with aligned openings 21a in which is mounted a pivot pin 22 that pivotally supports the clamping arm now to be described.

The clamping arm is also preferably in the form of an integral metal casting and includes, as viewed in the drawing, a substantially horizontal portion 23 that has on its upper side a vertical rib 24. The rib 24 intermediate its ends is divided to form an oval-shaped portion 24a, which portion, together with the horizontal portion 23 of the clamping arm, is provided with an elongated slot 25, through which the clamping screw, later to be referred to extends, it being noted that the slot 25 overlies the tubular hollow portion 13 of the body 10. The rib 24 of the clamping arm extends rearwardly, that is to the left as viewed in the drawing, beyond the portion 23 and is in the form of a rounded pivot pin receiving ear 24b that fits between the ears 21 and is provided with an opening through which the pivot pin 22 extends, wherefore the clamping arm is pivotally supported. The forward or right hand ends, as viewed in the drawing, of the horizontal portion 23 and the rib 24 of the clamping arm, merge into a fork 24c, which is for a purpose later to be explained.

A clamping screw 27, provided at one end with an operating wing 27a and carrying adjacent said operating wing a washer 27b, extends through the slot 25 in the clamping arm and has its lower threaded end screwed into the threaded boss 13a on the upper end of the hollow tubular portion 13 of the body, wherefore it will be seen by reference to Fig. 1 that the clamping screw 27 can be screwed inwardly or outwardly with respect to the hollow tubular portion 13. A coil spring 28 is carried by the clamping screw 27 between the upper end of the boss 13a and a plate 29 that is swingably mounted on the screw and is held by the spring 28 in tight engagement with the underside of the clamping arm. The spring 28 likewise maintains the clamping arm under spring tension which is overcome by the clamping screw in moving the clamping arm into clamping position but which causes the clamping arm to move outwardly from the clamping position when the clamping screw is screwed in the outward direction, as will be clearly apparent.

The plate 29 extends forwardly along the underside of the clamping arm and underlies the fork 24c, as clearly indicated in Figs. 1 and 2. The purpose of the plate 29 is to enable the clamp to be used with a vulcanizing unit for vulcanizing either plain rubber patches or the rubber bases of valve stems to an inflatable rubber article. When a vulcanizing unit for vulcanizing a plain rubber patch to an inflatable article is mounted in the clamp, the plate 29 will be in the position shown in Figs. 1 and 2 and the end thereof underlying the fork 24c will be in engagement with such vulcanizing unit, it being noted that said end of the plate 29 is provided with a downwardly extending protuberance 29a that engages with the upper surface of the vulcanizing unit and assists in maintaining the same in position upon the supporting cushion 16. However, when a vulcanizing unit for vulcanizing the rubber base of a valve stem is mounted in the clamp the plate 29 is swung outwardly from beneath the clamping arm about the clamping screw 27, so that the fork 24c of the clamping arm engages the upper side of the vulcanizing unit, while the valve stem associated with the rubber base that is to be vulcanized to the article extends upwardly through said fork.

As previously stated, the vulcanizer clamp embodying the present invention is primarily intended to be used with a vulcanizing unit that embodies an electrical heating element, and the clamp is so constructed that it can be employed with either a commercial source of electrical current or with current derived from storage batteries or other sources. The clamp is also so constructed that when a vulcanizing unit is mounted therein and vulcanization is taking place, the clamp forms with the electrical heating element of the unit a part of the electrical circuit.

A suitable transformer, indicated at 30 by dotted lines in Figs. 1 and 2, and in full lines in the perspective view, Fig. 3, is mounted in the housing compartment 11 of the body 10 of the clamp. This transformer may be of the iron core type, as indicated in Fig. 3 and in the diagrammatic view of Fig. 4. Although the transformer 30 may be positioned in the housing compartment 11 in various ways, a convenient and satisfactory way of doing this is to mount the transformer on the L-shaped closure plate 18, so that the plate and the transformer constitute a unit which can be applied to and assembled with the housing compartment. Preferably the transformer is held on the closure plate 18 by means of tabs 18a struck out of the closure plate on the inner side thereof and which removably retain the transformer in position.

The primary 30a of the transformer, see Fig. 4, has its opposite ends connected, respectively, to the two wires 31 and 31a of an elongated extension cord which carries at its opposite end a plug 32 for connecting the transformer 30 with a commercial electric current source. The extension cord passes into the housing compartment 11 through a suitably insulated bushing 31b supported in a slot formed in the wall of the housing compartment, as clearly shown in Fig. 1.

The secondary 30b of the transformer has one of its ends connected to one end of a short wire 33, the opposite end of which wire is grounded to the closure plate 18, preferably by being soldered thereto, or in any other well known manner, as indicated at 33a. The other end of the secondary 30b of the transformer is connected to one end of a lead wire 34 that extends outwardly of the housing compartment 11 through a rubber bushing 34a removably supported in a slot formed in the housing compartment 11 and similar to the slot which supports the rubber bushing 31b. The opposite or outer end of the wire 34 is connected to a slidable electrical connecting clip 34b, which is fully enclosed in an insulating jacket 34c, wherefore there is absolutely no danger of the clip coming in contact with the clamp and causing a short circuit.

Although various forms of vulcanizing units may be employed with a vulcanizer clamp embodying the present invention, there has been shown herein by way of illustration a vulcanizer unit similar to the unit shown in my Patent No. 2,075,705, issued March 30, 1937, and which comprises two readily and normally separable members which in use are superimposed one upon the other. The upper member 35 is in the form of two metal disks having between them insulating disks with the electrical heating element arranged intermediate the insulating disks. The electrical heating element has one of its ends insulated from the disks and extending outwardly of the circumference thereof, as indicated at 35a, while the opposite end of the heating element preferably is electrically connected to the metal disks of the member 35. The metal disks of the member 35 and the associated insulating disks and the electrical heating element are held in assembled position by suitable means, such as the hollow rivet 35b that extends centrally therethrough. The other member of the vulcanizing unit is in the form of a sheet metal disk 36 and is provided on its circumference with upstanding portions 36a that cooperate with recesses formed in the member 35 to insure the correct relative positioning of the two members together when the same are superimposed and mounted in the clamp. The disk member 36 is provided with a suitable vulcanizing patch 37. When the vulcanizing unit is mounted in the clamp, assuming an ordinary patch is to be vulcanized, the protuberance 29a of the plate 29 properly locates the clamp arm and the vulcanizing unit, since the projection extends into the hollow rivet 35b. The clamping screw 27 is turned down until sufficient vulcanizing pressure is exerted upon the vulcanizing unit. The plug 32 is connected to a source of electrical current, while the clip 34c is connected to the extended portion 35a of the electrical heating element in the vulcanizing unit.

It will be seen that the heating current is through the secondary 30b of the transformer, wire 34, the electrical heating element in the vulcanizing unit, the metal disks of the unit, and thence through the plate 29, the clamp, the closure plate 18 and the short wire 33 to the secondary 30b of the transformer.

Of course, when the rubber base of a valve stem is to be vulcanized to the inflatable article, the plate 29 is swung outwardly from beneath the clamping arm, as previously explained, and a slightly different form of vulcanizing unit is employed, in that the upper and lower members of the unit are provided with aligned centrally disposed openings through which the valve stem can extend.

In the event that the usual commercial source of electric current is not available, as, for instance, when on the road or in remote sections and the electrical energy for the vulcanizing operation is to be supplied from storage batteries or other sources, then the transformer 30 is not employed. In this situation one of the leads from the source of current is connected to the portion 35a of the heating element of the vulcanizing unit, and the other lead is connected to the clamp in any suitable place, as, for example, to the connecting angle clip 38 that is secured to the clamp arm.

In either event, however, it will be noted that the clamp forms a part of the electrical circuit through the heating element of the vulcanizing unit during the vulcanizing operation.

In Figs. 6 to 9 inclusive a form of clamp embodying the invention is illustrated, and it will be noted that this clamp is formed of sheet metal stampings, as distinguished from the previously described clamp which is formed of castings.

The clamp shown in Figs. 6 to 9 inclusive comprises an arm 39 that is a channel-shaped metal stamping and which has secured to its outer end by suitable means such as spot welding, for example, a circular sheet metal cup 40 forming a vulcanizing table and having arranged therein an article supporting cushion 41 preferably formed of soft rubber. The arm 39 adjacent its opposite end has secured thereto upstanding sheet metal ears 42 and 43, the left hand ends of said ears, as viewed in the drawings, being connected by a portion 44. The ears 42 and 43 may be secured to the arm in any suitable manner as, for example, by passing lugs formed on their lower edges through openings provided in the top wall of the arm 39 and then clinching said lugs against the underside of the top wall of the arm. A clamping arm is pivotally supported by the ears 42 and 43 on a pivot pin 45 and this arm comprises two sheet metal straps 46 and 47 placed side by side and provided at their left hand ends, as viewed in the drawing, with slightly off-set and spaced portions through which the pivot pin 45 extends. The right hand ends, as viewed in the drawings, of the straps 46 and 47 are off-set, as indicated at 46a and 47a, to provide a fork similar to the fork 24c in the previously described form of clamp and intended to be employed for the same purpose. The straps 46 and 47 intermediate their ends are provided with outwardly curved displaced portions through which the clamping screw 48 extends. Mounted upon the straps 46 and 47 intermediate their ends and so shaped as to tightly grip the straps at their opposite ends is an inverted channel-shaped member 49 formed of a sheet metal stamping, it being noted that the opposite ends of this member are tapered so as to tightly engage the straps. The clamping screw 48 passes through a washer 50 located above the member 49 and through said member and between the straps 46 and 47 and then through an opening in the top wall of the arm 39 and into threaded engagement with a nut 51 held in non-rotatable position within the channel arm 39 by suitable means such as by lugs 51a struck downwardly from the top wall of the channel. A coil spring 52 surrounds the screw 48 intermediate the arm 39 and the under side of a pivoted plate 53 corresponding in structure and function to the plate 29 of the clamp previously described. It being noted that the plate 53 is provided with a pair of projections 53a that serve to locate the plate with respect to the clamping arm when the plate is in the position shown in Fig. 6.

The channel-shaped arm 39 at its left hand end, as viewed in the drawing, is provided with laterally extending ears 39a and 39b through which are apertures to receive means for securing the clamp to a stationary support. The arm 39 at its left hand end fits upon a complementary portion 54a of a transformer housing 54, see Fig. 9, said arm being secured to said portion 54a by suitable means such as spot welding. The transformer housing 54 is substantially in the form of an inverted sheet metal stamping, the bottom edges of the side walls of which are provided with laterally extending flanges 55 having openings for means to secure the clamp to a stationary support.

The transformer (not shown since it is illustrated in connection with the previously described form of clamp) is mounted on a closure plate similar to the closure plate 18 previously described and illustrated in Fig. 3, with the exception, however, that the closure plate 56 of this modified form of construction is substantially U-shaped so as to close both ends and the bottom of the U-shaped housing 54. The closure plate 56 with the transformer thereon is held in position in the housing 54 by a series of metal straps 57 extending transversely of the housing beneath the plate and transformer and having their opposite ends passing through openings in the side walls of the housing and clinched against the housing as clearly indicated in Figs. 6 and 7.

In Figs. 6, 7 and 9 the primary of the transformer may be connected to a source of commercial electrical energy by the extension cord 58 as in the previously described form. One side of the secondary of the transformer can be connected to one end of the heating element of a vulcanizing unit mounted on the vulcanizing table by a lead wire 59 corresponding to the lead wire 34 previously described and which carries at its end a slidable insulated connecting clip 60 identical with the clip 34 previously described. The other end of the secondary of the transformer in this modified form is connected to the supporting plate 56, and hence to the clamp in the same way as the said side of the secondary in the previously described embodiment of the invention. The manner in which this form of the clamp functions and operates is identical with that described previously and hence need not be repeated herein, it being understood that the diagrammatic view of Fig. 4 applies equally as well to this modified form of clamp.

In Fig. 8 the clamp is illustrated without the transformer being associated therewith and this form of clamp is adapted for use with an electrical storage battery where commercial electrical current is not available.

It will be noted that the lead 61 from one of the battery terminals is connected by a clip 60 to a flat contact member 62 that is forced between the strap 47 and an end of the member 49 and is frictionally and electrically held in contact with said strap and member. The other terminal of the battery is connected with the heating element of the vulcanizing unit by a lead 63, as will be well understood. It will be noted that even though the transformer is not employed the clamp itself constitutes part of the electrical circuit through the heating element of the vulcanizing unit. It will also be understood that the vulcanizing unit illustrated in connection with Figs. 6 to 9 inclusive corresponds to that shown in connection with Figs. 1 to 5 inclusive, although various forms of vulcanizing units might be employed in either form of clamp.

Although preferred forms of the invention have been illustrated and described herein, it will be understood that the invention is susceptible of various modifications and adaptations within the scope of the appended claims.

Having thus described my invention I claim:

1. A vulcanizer clamp comprising a body provided with an article supporting table, a clamp arm overlying said table and formed of electrically conductive material, means movably connecting said arm to said body, means for moving said arm toward said table with a clamping action, and means for connecting said arm to one side of an electrical circuit whereby a separate vulcanizing unit may be used in the clamp of the type having one end of an electrical heating element insulated from the unit and adapted to be connected to one side of an electrical circuit while the other end of said element is electrically connected with the unit.

2. A vulcanizer clamp comprising a body of electrically conductive material provided with an article supporting table, a clamp arm overlying said table and formed of electrically conductive material, means movably and electrically connecting said arm to said body, means for moving said arm toward said table with a clamping action, a transformer carried by said clamp, means connecting the primary of said transformer to a source of electrical energy, means connecting one end of the secondary of the transformer to said body, and means for connecting the other end of said transformer secondary to one end of the electrical heating element of a vulcanizing unit mounted on said table.

3. A vulcanizer clamp comprising a body of electrically conductive material provided with an article supporting table, a clamp arm overlying said table and formed of electrically conductive material, means pivotally and electrically connecting said arm to said body, means for moving said arm toward said table with a clamping action, a transformer mounted in said body, means for connecting the primary of said transformer to a source of electrical energy, means for connecting one side of the secondary of said transformer to said body, and means for connecting the other side of said secondary to one end of the electrical heating element of a vulcanizing unit mounted on said table.

4. A vulcanizer clamp comprising a body of electrically conductive material provided with an article supporting table and with a hollow housing compartment, a clamp arm overlying said table and formed of electrically conductive material, means movably and electrically connecting said arm to said body, means for moving said arm toward said table with a clamping action, a transformer mounted in said hollow compartment, means for connecting the primary of said transformer to a source of electrical energy, means for connecting one end of the secondary of said transformer to said body, and means for connecting the other end of said secondary to one end of the electrical heating element of a vulcanizing unit mounted on said table.

5. A vulcanizer clamp comprising a body provided with an article supporting table and having a hollow housing compartment, one side of which is open, a clamp arm overlying said table, means movably connecting said arm to said body, means for moving said arm toward said table with a clamping action, a closure plate for said open side of the housing compartment secured to said body, a transformer carried by said plate, means for connecting the primary of said transformer to a source of electrical energy, and means for electrically connecting the secondary of said transformer with the heating element of a vulcanizing device mounted on said table.

6. A vulcanizer clamp comprising a body provided with an article supporting table and having a hollow housing compartment open on two sides, a clamp arm overlying said table, means movably connecting said arm to said body, means for moving said arm toward said table with a clamping action, an L-shaped closure plate for closing the open sides of said housing compartment and secured to said body, a transformer carried by said plate, means for connecting the primary of said transformer with a source of electrical energy, and means for connecting the secondary of said transformer to the heating element of a vulcanizing unit mounted on said table.

7. A vulcanizer clamp comprising a body of electrically conductive material provided with an article supporting table and a hollow housing compartment open on two sides thereof, a clamp arm overlying said table and formed of electrically conductive material, means movably and electrically connecting said arm to said body, means for moving said arm toward said table with a clamping action, a substantially L-shaped closure plate for closing the open side of said housing compartment and secured to said body, a transformer mounted on said plate, means for connecting the primary of said transformer to a source of electrical energy, means for connecting one end of the secondary of said transformer to said plate and means for connecting the other end of the secondary of the transformer to one end of the electrical heating element of the vulcanizing device mounted on said table.

8. A vulcanizer clamp comprising a body provided with an article supporting table, a transformer carried by said clamp, means for connecting the primary of said transformer to a source of electrical energy, means for connecting the secondary of the transformer to the electrical heating element of a vulcanizing device mounted on said table, a clamp arm having one of its ends overlying said table and adapted to engage with and exert pressure on a vulcanizing device positioned on said table, means movably connecting said arm with said body, means for moving said arm toward said table with a clamping action, said end of said clamp arm being provided with a forked portion, a plate underlying said arm and said forked portion, means swingably connecting said plate with said arm, and spring means for retaining said plate in tight engagement with the underside of said arm.

9. A vulcanizer clamp comprising a body provided with an article supporting table and with a housing compartment, a clamp arm overlying said table, means movably connecting said arm with said body, means for moving said arm toward said table with a clamping action, a transformer mounted in said housing compartment, means for connecting the primary of said transformer to a source of electrical energy, and means for connecting the secondary of said transformer to the electrical heating element of a vulcanizing unit mounted on said table.

10. A vulcanizer clamp comprising a body of electrically conductive material provided with an article supporting table and a housing compartment one side of which is open, a clamp arm overlying said table and formed of electrically conductive material, means for movably and electrically connecting said arm with said body, means for moving said arm toward said table with a clamping action, a closure plate for said open side of the housing compartment secured to said body, a transformer carried by said plate, means for connecting the primary of said transformer to a source of electrical energy, means for connecting one side of the secondary of said transformer with said body, and means for connecting the other side of the secondary of said transformer with one end of the heating element of a vulcanizing device mounted on said table.

11. A vulcanizer clamp comprising a body in the form of a metal casting and provided with an article supporting table and a hollow housing compartment, a clamp arm in the form of a metal casting overlying said table, means movably connecting said arm with said body, means for moving said arm toward said table with a clamping action, a transformer mounted in said hollow compartment, means for connecting the primary of said transformer to a source of electrical energy, and means for connecting the secondary of said transformer to the electrical heating element of a vulcanizing unit mounted on said table.

12. A vulcanizer clamp comprising a body provided with an article supporting table and with a housing compartment all of which are formed of sheet metal stampings, a clamp arm formed of sheet metal stampings overlying said table, means connecting said arm with said body, means for moving said arm toward said table with a clamping action, a transformer mounted in said housing compartment, means for connecting the primary of said transformer to a source of electrical energy, and means for connecting the secondary of said transformer to the electrical heating element of a vulcanizing unit mounted on said table.

13. A vulcanizer clamp comprising a body provided with an article supporting table and having a housing compartment open at its ends and bottom, said body being formed of sheet metal stampings, a clamp arm overlying said table, means movably connecting said arm with said body, means for moving said arm toward said table with a clamping action, a substantially U-shaped closure plate for closing the open ends and bottom of said housing compartment and secured to said body, a transformer carried by said plate, means for connecting the primary of said transformer with a source of electrical energy, and means for connecting the secondary of said transformer to the heating element of a vulcanizing unit mounted on said table.

14. In combination a vulcanizer clamp provided with an article supporting table and a vulcanizing unit mounted on said table and of the type having one end of an electrical heating element insulated from the unit and adapted to be connected to one side of an electrical circuit while the other end of said heating element is electrically connected to the unit, said clamp including a movable clamp arm electrically connected with and exerting clamping pressure on the said vulcanizing unit, and means for establishing an electrical circuit through the heating element of said vulcanizing unit and including said clamp.

15. In combination a vulcanizer clamp including a body provided with an article supporting table, a vulcanizing unit positioned on said table and of the type having its clamp engaged side formed of electrically conductive material and being provided with an electrical heating element one end of which is electrically connected to said side while the opposite end thereof is electrically insulated therefrom and is adapted to be connected to one side of an electrical circuit, an electrically conductive clamp arm having a portion overlying said table, means movably connecting said arm to said body so that said portion can be brought into electrical contact with said side of said unit, and means for connecting said arm to the other side of said electrical circuit.

16. In combination a vulcanizer clamp including a body of electrically conductive material provided with an article supporting table and a housing compartment, a vulcanizing unit positioned on said table and of the type having its clamp engaged side formed of electrically conductive material and being provided with an electrical heating element one end of which is electrically connected to said side while the opposite end thereof is electrically insulated therefrom and is adapted to be connected to one side of the electrical circuit, an electrically conductive clamp arm having a portion overlying said table, means for movably and electrically connecting said arm to said body so that said portion can be brought into electrical contact with said side of said unit, a transformer located in said housing compartment, means for connecting the primary of said transformer to an electrical circuit, means for connecting one side of the secondary of said transformer to the end of the electrical heating element which is insualted from the clamp engaged side of said vulcanizing unit, and means for electrically connecting the other side of said secondary to said body whereby the electrical circuit through said vulcanizing unit includes said body and said clamp arm.

JOHN C. CROWLEY.

Disclaimer 2,272,965.—*John C. Crowley*, Cleveland Heights, Ohio. VULCANIZER CLAMP. Patent dated Feb. 10, 1942. Disclaimer filed Mar. 28, 1950, by the assignee, *The Dill Manufacturing Company*.

Hereby enters this disclaimer to claims 8, 9, and 16 of said patent.

[*Official Gazette April 25, 1950*.]